INVENTORS
CLAUDE W. RIDDLE
JAMES A. SINGLEY

ATTORNEY

United States Patent Office 3,152,575
Patented Oct. 13, 1964

3,152,575
ANIMAL FEEDER
James A. Singley, 806 Glenn St., and Claude W. Riddle, Rte. 3, both of Newberry, S.C.
Filed Aug. 22, 1962, Ser. No. 218,695
2 Claims. (Cl. 119—56)

This invention relates to animal feeders which are especially useful for feeding two cows desired amounts of feed from one feeder.

Devices constructed in accordance with the present invention are especially useful in the stanchion type of barn wherein cows are placed within closures and fed at the same time that they are milked. It is desirable to feed cows during the milking process as it has been found that a greater quantity of milk is produced in this way. Efforts have been made prior to the present invention to provide mechanisms for dispensing measured amounts of feed. Such devices do not achieve the measuring capabilities desired even with pelleted feed. Such devices are incapable of coping with the problem of dispensing ground feed because of the tendency of such feed to bridge or clog within the feeding mechanism.

Accordingly, it is an important object of this invention to provide an improved animal feeding device capable of feeding two animals in adjacent closures a predetermined measured amount of feed.

Another important object of the invention is to provide means for preventing the bridging of feed within the feeding mechanism of such devices.

Another object of the invention is to provide an animal feeding device which may be easily manipulated by the operator just prior to milking for positively delivering a selected amount of feed to animals in adjacent closures selectively.

The construction designed to carry out the invention will be hereinafter described, together with other features thereof.

Figure 1:
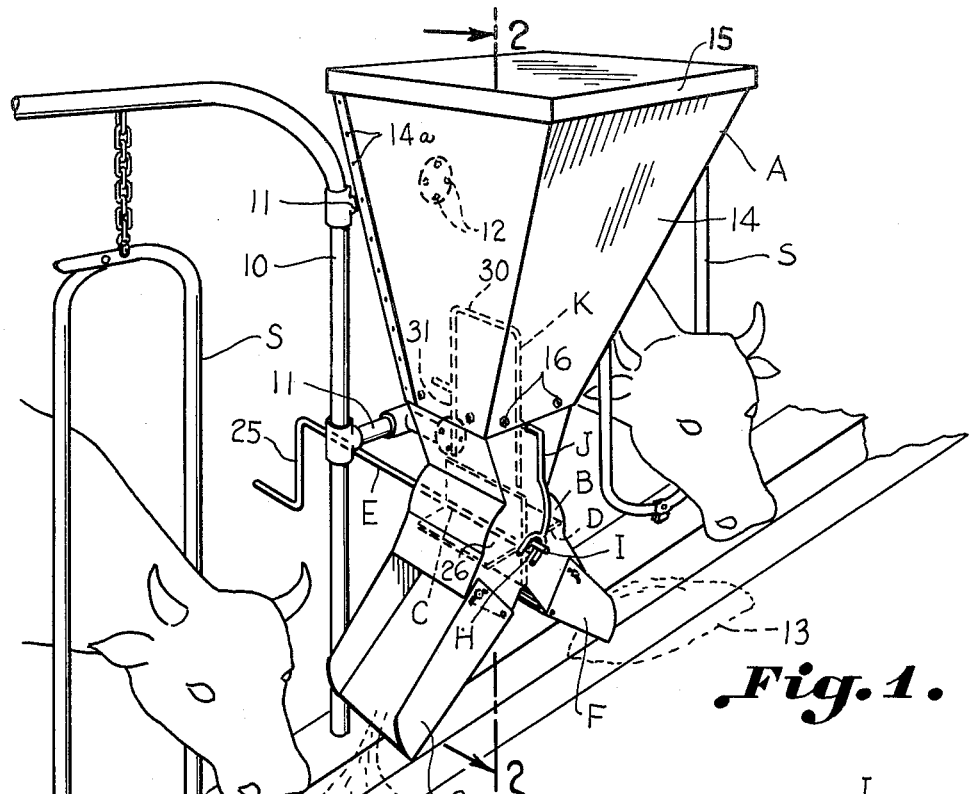
Figure 2:
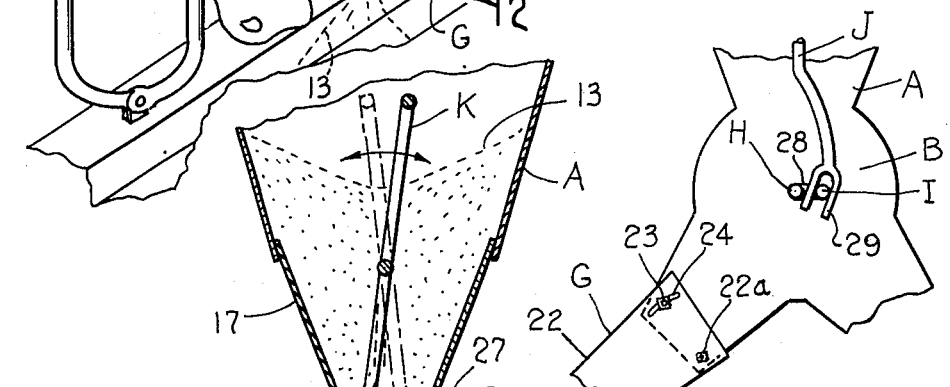
Figure 3:
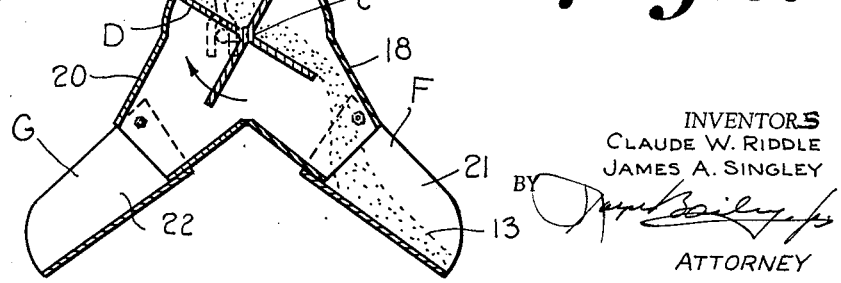

The invention will be more readily understood from a reading of the following specification and by reference to the accompanying drawing forming a part thereof, wherein an example of the invention is shown and wherein:

FIGURE 1 is a perspective view illustrating a feeding device constructed in accordance with the present invention positioned within a stanchion barn, FIGURE 2 is an enlarged longitudinal sectional view taken on the line 2—2 in FIGURE 1, and FIGURE 3 is an enlarged front elevation illustrating the lower portion of the device shown in FIGURE 1.

The drawing illustrates an embodiment of the present invention for feeding animals in adjacent closures measured amounts of feed. A hopper A is positioned between the closures for moving feed placed therein by gravity. A chamber B, having a substantially circular vertical longitudinal cross-section, receives feed by gravity fed from the hopper. A transverse shaft C is axially disposed within the chamber. A plurality of spaced radially extending partitions D are fixed to the shaft forming containers for measured amounts of feed. Means E is provided for rotating said shaft continuously in either direction for a predetermined number of revolutions. A chute F communicates with successive containers as the shaft is rotated in one direction thus receiving a measured amount of feed from said containers and directing same to one closure, and another chute G communicates with successive containers when the shaft is rotated in the other direction thus receiving a measured amount of feed from said containers and directing same to the other closure. A projecting portion H of said shaft extends through and beyond a wall of the chamber B. Eccentric means I is carried by the projecting portion. A substantially vertical rod J is operated by the eccentric means, and a pivoted agitator K is pivotally carried within the hopper and is oscillated by the rod.

As illustrated in FIGURE 1, the feeding device is positioned between the closures S in a stanchion barn. The members S limit a movement of the cows during the milking and feeding operation. The feeding device is fastened to the support members 10 which also position the members S. This is accomplished by suitable pipe members 11 which are fastened to the hopper A as by screws 12. It will be noted that feed 13 within the hopper is directed by the feeding device to a trough or manger on each side thereof selectively.

The hopper A has an upper portion 14 which is preferably constructed from a single piece of sheet metal. The free edges of the upper portion are preferably joined as by rivets 14a or by welding. The hopper illustrated thus has four walls which converge downwardly. The enlarged top portion of the hopper A is provided with a suitable cover 15. The upper portion 14 has a constricted lower portion which is fastened as by bolts 16 to a second hopper like portion 17, which is formed integrally with the measuring chamber B. It will be noted that the hopper like portion 17 has a restricted lower portion which communicates with the mixing chamber B.

A transverse shaft C is axially disposed within the chamber B and carries four partitions D fixed thereto at right angles to each other. The chamber B has a substantially circular vertical longitudinal cross-section, so as to accommodate the partitions D for executing full revolutions therein responsive to the turning of the shaft C. As the shaft C is turned the compartments defined between the partitions D are filled with feed 13, which is deposited into chute F or chute G depending upon the direction in which the shaft C is turned.

By turning the shaft C in the direction of the arrow in FIGURE 2 the feed 13 is dispensed to the chute F. The chute F includes a passageway 18 which converges laterally and downwardly. It will be noted that the mouth of the chute portion 18 is enlarged so as to provide a maximum opportunity for the feed carried within the compartment communicating therewith, to be fed by gravity into the passageway 18.

It will be noted that the compartments defined by the partitions D are sufficiently large that it is possible for the hopper A to communicate directly with the passageway 18. This would be the case were the partitions D stopped in a position slightly counter-clockwise to that illustrated in FIGURE 2. It is desirable, therefore, that the partitions D be so positioned after rotation that such communication be avoided. When an empty compartment first opens to the hopper A to receive feed therefrom, the next succeeding partition D closes off communication between the hopper and the chute sufficiently quickly to prevent spilling of feed under normal operation.

It will be noted that if the shaft C is turned counter-clockwise in FIGURE 2, that feed will be introduced into passageways 20 and 18 respectively. It will be noted in should be pointed out that the lower portions of the chutes F and G have open portions 21 and 22 respectively. These open channel portions may be constructed of metal or rubber like material, and may be adjustably connected to the passageway 20 and 18 respectively. It will be noted in FIGURE 3 that the channel 22 is connected to the passageways 20 and 18 respectively. It will be noted in connected as by a bolt 23 at the top. The arcuate slot 24 permits vertical adjustment of the channel 22. The channel 21 is similarly connected with the passageway 18.

The means E for rotating the partitions F within the chamber B includes a crank 25 which projects rearwardly between the closures S. The crank 25 may be positioned as desired, and is maintained in such position by the weight and friction of the feed 13 which fills a compartment communicating with the hopper A.

A projecting portion H of the shaft C extends beyond the front wall 26 of the compartment B. The front wall 26 and the rear wall 27 of the compartment B serve as bearing supports for the shaft C. A longitudinal link 28 connects the member I eccentrically with respect to the shaft C so as to transmit oscillatory motion through the yoke 29 to the substantially vertical offset rod J.

The rod J has fixed connection to an agitator K which is substantially vertically positioned within the hopper A. The agitator K has an upwardly extending portion 30, and a downward extension 31 extending to the restricted lower portion of the hopper A. It is evident that through the oscillatory motion imparted to the agitator K, bridging or clogging of the feed 13 is prevented, and a free flow of feed from the hopper A into the chamber B is assured. If desired, an upwardly extending rod may be freely connected to the upper portion 30 so as to avoid bridging in the upper reaches of the hopper A.

While a preferred embodiment of the invention has been described using specific terms, such description is for illustrative purposes only, and it is to be understood that changes and variations may be made without departing from the spirit or scope of the following claims.

What is claimed is:

1. A device for feeding animals in adjacent enclosures measured amounts of feed including, a hopper having substantially vertical sides positioned between closures for moving feed placed therein by gravity, a chamber having a substantially circular vertical longitudinal cross section into which the feed is gravity fed from said hopper, said hopper having a restricted lower portion connected to said chamber through which the feed passes from the hopper into the chamber, a transverse axially disposed shaft within said chamber, a plurality of spaced radially extending partitions fixed to said shaft forming containers for measured amounts of feed, means for rotating said shaft continuously in either direction for a predetermined number of revolutions, a chute communicating with successive containers as the shaft is rotated in one direction thus receiving a measured amount of feed from said containers and directing same to one closure, another chute communicating with successive containers when the shaft is rotated in the other direction thus receiving a measured amount of feed from said containers and directing same to the other closure, a projecting portion of said shaft extending through and beyond a wall of said chamber, eccentric means carried by said projecting portion, a substantially vertical rod having an offset portion carried by said eccentric means without the hopper on one end thereof, and an agitator carried within the hopper and pivoted in the sides thereof extending downwardly into said restricted portion of the hopper and being connected to the other end of the vertical rod so as to be oscillated by said rod.

2. A device for feeding animals as set forth in claim 1, in which said chutes are connected to said hopper by vertically adjustable means.

References Cited in the file of this patent

UNITED STATES PATENTS

| | | |
|---|---|---|
| 1,818,419 | Miller | Aug. 11, 1931 |
| 1,845,072 | Beckman | Feb. 16, 1932 |
| 2,168,639 | Yeaman | Aug. 8, 1939 |
| 2,706,581 | Albers | Apr. 19, 1955 |
| 3,033,164 | Evers | May 8, 1962 |